May 11, 1965   R. C. AXT   3,182,435
APPARATUS FOR FRACTIONATION OF GASEOUS MIXTURES
Filed April 29, 1960   4 Sheets-Sheet 1

Fig. 1

Robert C. Axt   Inventor

Fig. 2

Robert C. Axt    Inventor

United States Patent Office 3,182,435
Patented May 11, 1965

3,182,435
APPARATUS FOR FRACTIONATION OF
GASEOUS MIXTURES
Robert C. Axt, Short Hills, N.J., assignor to Esso Research
and Engineering Company, a corporation of Delaware
Filed Apr. 29, 1960, Ser. No. 25,636
4 Claims. (Cl. 55—162)

This invention relates to an apparatus for fractionation of gaseous mixtures. It relates particularly to an apparatus for reducing the concentration of at least one given key component in a stream of a gaseous mixture containing that component. It relates more particularly to an apparatus of the kind aforesaid wherein and whereby the given component is retained at least in part on and in at least one bed of adsorbent material selective for that component. It relates still more particularly to such an apparatus wherein and whereby there is no intentional flow of heat to that adsorbent bed from any external heat source, nor from the bed to any external heat sink, and it relates even still more particularly to such an apparatus characterized by lack of external heat flow, the use of a single adsorbent bed only, and the employment of only an intermittently flowing stream of the gaseous mixture to be fractionated.

For purposes of this invention, the terms "gas" and "gaseous" as employed in the following description and claims are to be understood to include not only materials that are conventionally considered to be gases, but also those materials usually thought of as being vapors. Also, the term "key component" is to be understood as designating the component or components selectively adsorbed from a mixture stream of gaseous material fed initially to an adsorptive fractionation apparatus.

In the art of adsorptive fractionation of gaseous mixtures, an apparatus and method class for effecting what is known at least colloquially as "heatless" fractionation has come recently into rather considerable use. For pictorial and schematic illustration of an apparatus of this class, reference may be had to the article "Removing Contaminants from Shipboard Air Systems" on pp. 16–18 of the December 1959, issue of the Bureau of Ships Journal. In this article there is portrayed and to some extent described a "heatless" air dryer furnished by the Trinity Equipment Corporation.

Drying of air, that is, the removal of water vapor from an air-water vapor mixture to give a product stream of relatively dry air is only exemplary of gaseous fractionations which may be carried out by the "heatless" technique. Another is the removal of oil vapor from an air-oil vapor mixture to give a product stream of clean air. Air needed at any elevated pressure may frequently become contaminated with oil supplied to lubricate the compressing machinery. Removal of this oily and at least partially vaporous contaminant from the compressed air is a significant problem, as pointed out in the above-cited article.

The conventional apparatus and method for "heatless" fractionation fo gaseous mixtures provide and call for a stream of a gaseous mixture at relatively high pressure to be passed cyclically and in alternating sequence through each of two paired fractionating zones. These zones each comprise a chamber vessel containing a body or bed of adsorbent material having a selective affinity for at least one key component of the gaseous mixture. During passage of the original feed stream of the mixture through any one zone, this stream of course passing over and through the body of adsorbent material therein, this one zone is on an adsorption cycle. For the period of this cycle the entire adsorbent body of the zone is maintained under substantially the pressure of the original feed stream introduced thereinto. After passage through the zone, those components of the feed stream not adsorbed therein are discharged therefrom as a primary effluent product stream at substantially the original feed stream pressure.

Essentially simultaneously with either one of the two fractionating zones of the conventional apparatus and method being placed on an adsorption cycle at relatively high pressure, the adsorbent bed of the other zone is depressurized by opening this zone to the atmosphere or some other region of relatively low pressure. In this condition, this other zone is on a desorption cycle. At substantially the same time that pressure on this other zone is reduced, at least a portion of the primary effluent product stream from the one zone then on an adsorption cycle is withdrawn from the total primary effluent discharge therefrom, and this withdrawn portion is introduced into the reduced pressure zone to pass over and through the body of adsorbent material therein. Intermediate the two zones, this withdrawn portion is itself passed through a pressure reducing device such as a flow control valve or an orifice. Passage of the withdrawn primary effluent portion as a reflux stream through the zone on a desorption cycle is effected in counterflow relation to the high pressure gaseous mixture feed stream passed through the adsorbent bed thereof while the zone was previously on an adsorption cycle. The bed is thus backwashed on its desorption cycle.

As thus introduced into the zone on a desorption cycle, the withdrawn portion of the primary effluent stream from the zone on an adsorption cycle is relatively free of the key component or components retained by and present on and in the adsorbent material of the zone on a desorption cycle. Also the adsorbent material thereof will have been slightly warmed by the heat of adsorption released thereto during the previous cycle at relatively high pressure. By proper adjustment of the adsorption-desorption cycle periods, this heat of adsorption will be available to counteract the cooling effects of the heat of desorption extracted from the adsorbent material during the cycles thereof at relatively low pressure.

Cycle periods are customarily quite short for at least laboratory and factory-size fractionation apparatus; that is, these periods may be from only a few minutes to less than one minute. Generally speaking, the adsorbent material of a fractionating zone of a "heatless" fractionation apparatus may be said to be cycled rapidly in pressure with no wide swing in temperature during either its adsorption or desorption period. In particular, there is no intentional and hardly any actual flow of heat to the adsorbent bed of the zone from any external heat source, nor from the bed to any external heat sink.

Still considering the adsorption zone of a conventional two-zone apparatus which is on a desorption cycle, the combined effects of previously stored heat, reduced pressure, and purging or scavenging by the primary effluent reflux portion used for backwashing cause the previously adsorbed key component material to be evolved and driven out as a gas. This prepares the adsorbent body of the zone to take up the key component or components from the relatively high pressure feed stream of gaseous mixture introduced thereinto during the next adsorption cycle for this zone. Desorption of the previously adsorbed key component material tends to cause an increase in volumetric flow of gas through the zone in the direction of flow, as the key component material evolved from the adsorbent body is mixed with the reflux portion. Contrariwise, on an adsorption cycle, taking up of key component material by the adsorbent body from the feed stream tends to cause a decrease in the volumetric flow of gas through the zone in the direction of flow.

For purposes of this description, the effluent stream discharged from a fractionating zone which is on its adsorption cycle is termed, as it already has been, a "primary" effluent stream. On the other hand, an effluent stream discharged from a zone which is on its desorption cycle is termed a "secondary" effluent stream. In the primary effluent stream the key component or components will be present in a decreased concentration compared to their concentration in the feed stream. In the secondary effluent stream the key component or components will be present in an increased concentration on the same basis. Ordinarily a gaseous material having the composition of the primary effluent stream will be the product toward which the operation is directed. The material of the secondary effluent stream may, however, have value in some cases.

For a description and graphic illustration of the steps required to bring a conventional "heatless" fractionation apparatus from an idle condition to a working or producing condition, reference may be had to Bulletin No. DD–180 published by the aforementioned Trinity Equipment Corporation of Cortland, New York. This bulletin is entitled, "Heat-Les Dryer, Dyanamic Dehumidifiers for Compressed Gases."

In the example there given, for the fully conditioned apparatus, the feed stream comprises an air and water vapor mixture with a total pressure of about 60 p.s.i.a. which is the pressure on the adsorbent body of the fractionating zone on an adsorption cycle; the total pressure on the adsorbent body of the zone on a desorption cycle is about 15 p.s.i.a.; the partial pressure of water vapor in the feed stream is about 16 mm. Hg, and the primary effluent stream leaving the zone on an adsorption cycle comprises air with a vanishingly small water vapor content which may correspond, according to the bulletin, to a dewpoint as low as −180° F. Not all of the primary effluent stream is available as a useful product because at least a portion of this stream must be withdrawn and flowed through a pressure reducing device, and then passed into the zone on a desorption cycle as a reflux stream for backwashing purposes.

A first end of each zone of the apparatus illustrated in the Trinity Equipment Corporation bulletin is the end at which the zone receives the gaseous mixture feed stream at about 60 p.s.i.a. and discharges the secondary effluent stream at about 15 p.s.i.a., depending on whether the zone is adsorbing or desorbing the key component or components. A second end of each zone is the end at which the zone receives the reflux stream at about 15 p.s.i.a. and discharges the primary effluent stream at about 60 p.s.i.a., depending on whether the zone is desorbing or adsorbing the key component or components.

For a relatively small part of the length of each zone beginning at the above-defined first end thereof, as shown by the bulletin, the adsorbent material contained therein holds water vapor exerting a pressure of about 16 mm. Hg. For a somewhat greater part of the length of each zone beginning at the above-defined second end thereof, the adsorbent material contained therein holds water vapor exerting only a vanishingly small pressure, and is described as being "super dry."

In neither fractionating zone, however, is the region of the adsorbent material therein which holds water vapor exerting a pressure of about 16 mm. Hg contiguous with that region of the adsorbent material holding water vapor exerting only the aforedescribed vanishingly small pressure. Between these regions in the adsorbent material of each zone shown in the bulletin there is a region holding water vapor exerting pressures across a range from about 16 mm. Hg to the vanishingly small pressure. This intermediate region is described as having a "moisture gradient," and the gradient region may be said to be bounded by vapor pressure "fronts" shown in the bulletin as lines generally transverse to the direction of gas flow through any zone.

These fronts are of a dynamic nature. As flow of gaseous material is continued through a fractionating zone, the vapor pressure fronts in the adsorbent bed thereof will move in the direction of flow. Therefore there will be movement of the gradient region itself along the adsorbent bed of any zone, this region being defined between the vapor pressure fronts therein. Motion of the gradient region of a zone will be of a reciprocating or oscillatory nature as gas flow through the zone is cyclically alternated in direction.

It is to be understood, of course, that exact shapes of the vapor pressure fronts may not be known, nor can it be said with certainty that the fronts are sharply defined. The foregoing and likewise any subsequent description of the gradient region boundaries, as they are illustrated in the Trinity Equipment Corporation's Bulletin No. DD–180, is to be understood as being for reasons of graphic illustration only. On the other hand, however, the measurable behavior and performance in service of the fractionating zones of a conventional apparatus for "heatless" fractionation of gaseous mixtures are not inconsistent with the above-recited concept of vapor pressure fronts and a gradient region therebetween.

Now to consider certain particular operating characteristics and relationships of a conventional two-zone "heatless" fractionation apparatus such as that illustrated diagrammatically in the Trinity Equipment Corporation bulletin, suppose that this apparatus is operating satisfactorily to give a product portion of a primary effluent stream wherein there is a minimum concentration of key component or components. In this circumstance the gradient region in the adsorbent bed of either fractionating zone will be moving back and forth intermediate but never reaching the ends of this bed as the zone is cyclically alternated between adsorbing and desorbing conditions. Now suppose that the frequency of cyclical alternation of direction of gas flow through the fractionating zones is gradually reduced. With this reduction in frequency the distance along either adsorbent bed traversed by the gradient region therein for the period of any given cycle will be increased.

With continued reduction in cyclical frequency of gas flow reversal and corresponding increase in cycle periods, a phenomenon known as "break through" will occur. This means that the vapor pressure front defining the leading edge of the gradient region in the adsorbent bed of a zone when the zone is on an adsorption cycle will pass beyond the end of the bed whereat the primary effluent stream is discharged. When this happens, the concentration of the key component or components in the primary effluent stream will rise, at least momentarily, above the minimum value theretofore achieved. Accordingly, other apparatus and operating features and circumstances being determined, a lower limit on the frequency of cyclical alternation of direction of gas flow through the adsorbent material of any fractionating zone for the avoidance of break through is imposed by the length of the bed of adsorbent material itself.

To establish the proper ratio of feed stream flow to reflux flow into a fractionating zone of a "heatless" fractionation apparatus for the achievement of a desired reduction in concentration of key component from the feed stream to the product stream, the important consideration will be that of comparative volumetric flows. Some particular and significant comparisons of this kind will be discussed.

Basic to this discussion will be the following assumptions: (1) that whenever the pressure under which the adsorbent material bed of any fractionating zone is held changes, it changes equally, substantially simultaneously, and at an equal rate for all parts of the bed; (2) that frequency of cyclical alternation of direction of gas flow through the zone is sufficiently high to prevent break through when minimum concentration of a key component in the product stream is in fact desired, and (3) that the adsorbent material bed of the zone is sufficiently long and sufficiently finely granulated or otherwise provided with extended active surface that no key component gas molecule can flow through the bed and not touch such active adsorbent surface.

Also basic to this discussion will be the following definitions: (1) that $F_T$ represents the total volumetric flow of feed into a fractionating zone on an adsorption cycle during that cycle, this quantity being adjusted to certain conditions of temperature and pressure such as 0° C. and 1 atmosphere; (2) that $F_R$ represents the total volumetric flow of reflux into the zone on a corresponding desorption cycle during that cycle, this quantity being adjusted to the same temperature and pressure as $F_T$; (3) that $P_A$ represents the absolute pressure of the feed stream entering the zone on the adsorption cycle averaged throughout the zone, and (4) that $P_D$ represents the absolute pressure of the reflux stream entering the zone on the corresponding desorption cycle averaged throughout the zone.

With these assumptions and definitions accepted and established, the quantities to be compared are $F_R$ and $F_T$ $(P_D/P_A)$.

If $F_R$ be greater than or equal to $F_T$ $(P_D/P_A)$, the concentration of the key component in the product stream will be lowered progressively as operation of the "heatless" adsorptive fractionation apparatus is continued. This concentration will approach a limiting value of zero, that is, the condition of an absolutely dry product in the case of fractionation of an air and water vapor mixture. The greater the amount by which $F_R$ exceeds $F_T$ $(P_D/P_A)$, the smaller will be the product stream in comparison with the feed stream. With concentration of the key component in the product stream fully lowered, optimum product take-off conditions will exist when $F_R$ is equal to $F_T$ $(P_D/P_A)$. All of the foregoing is true no matter how heavily loaded with key component material the adsorbent bed of any fractionating zone of the apparatus may be at the start of operations.

If $F_R$ be less than $F_T$ $(P_D/P_A)$ but greater than zero, the concentration of the key component in the product stream will still be lowered for a while as operation of the "heatless" adsorptive fractionation apparatus is continued. This concentration will, however, approach a limiting value other than zero. What the terminal concentration of key component material in the product stream will be will depend upon the material balance taken around the system. Obviously, the greater the amount by which $F_T$ $(P_D/P_A)$ exceeds $F_R$, the greater will be the concentration of key component material in the product stream when the system has achieved a condition of essentially stable operation; that is, when the condition of a material balance has been achieved.

In many cases it will be desired to achieve a product stream in which there is essentially no key component material present. Such a case would be air freed of moisture for use in control instrument systems. On the other hand, it may often be desired to achieve a product stream in which there is some key component present, but in a concentration less than that in which it exists in the feed stream. Such a case would be air with a determined humidity for use in providing a controlled atmosphere for the preservation of chemical materials, foodstuffs, textiles, or paper, etc. With the afore-defined values of $F_T$, $P_A$, and $P_D$ established for the operation of a given "heatless" adsorptive fractionation apparatus, the concentration of a key component material in the product stream may be regulated through control of $F_R$. Increasing $F_R$ to achieve a product gas more completely free of the key component will, of course, diminish the product flow rate. However, as indicated above, $F_R$ need not be increased substantially beyond the condition that $F_R = F_T$ $(P_D/P_A)$ for best results of product purity with the system stabilized.

For rapid conditioning of an adsorptive fractionation system of the kind hereinbefore described, operations may be continued for a while with no product stream being taken off, that is, with the whole non-adsorbed feed stream being used as a reflux stream. With proper concentration gradients of the key component or components established in the beds of adsorbent material, removal of primary effluent product material may be started with consequent reduction in $F_R$ until a rate of product removal is achieved at which $F_R$ is equal to or, preferably, slightly greater than $F_T$ $(P_D/P_A)$ for best results of product purity as stated previously.

The above-described apparatus and method for the "heatless" fractionation of gaseous mixtures, that is, those providing and calling for a stream of a gaseous mixture at a relatively high pressure to be passed cyclically and in alternating sequence through each of two paired adsorptive fractionating zones, are very useful and highly successful in providing an essentially steady product stream of concentrated or purified gas. This steady stream results from the sequential blending of the product parts of the primary effluent streams emanating from each of the beds of adsorbent material in the two zones.

According to the present invention, an apparatus for "heatless" fractionation of gaseous mixtures is provided in which only a single fractionating zone comprising a bed of adsorbent material is employed, but which, like the conventional two-zone apparatus, is capable of yielding a steady stream of a concentrated or purified gaseous product. The fractionating zone of the apparatus of this invention is connected at one end to a source of compressed gas such as the discharge side of an air compressor wherefrom it can receive a gaseous mixture to be fractionated. At its other end it is connected to an accumulator or gas storage means whereinto it can discharge a primary effluent stream of gaseous material. Product gas to be used in external service may be withdrawn from this accumulator.

Between the accumulator and the primary effluent discharge end of the fractionating zone there is also a gas flow connection provided with a suitably oriented and adjusted pressure reducing device wherethrough gaseous material may be cycled back into the fractionating zone as a purge or reflux stream for the bed of adsorbent material therewithin, upon the zone being vented to the atmosphere or other region of relatively low pressure. Control of this venting will preferably be exercised by a pressure-sensitive switch on the product and reflux gas accumulator. This switch will function also to stop and start the compresor at certain predetermined upper and lower levels of pressure in the accumulator. It may function additionally to relieve pressure on the discharge side of the compressor upon this machine being stopped, and thus allow the compressor to be restarted in an unloaded condition according to good practice.

Together with the pressure-sensitive switch mounted thereon, the accumulator of the apparatus embodiment of this invention itself acts as a cycle timing device as well as simply a gas storage means. By this action it allows elimination from the system of a separately installed cycle timer or timers such as are needed in the conventional apparatus for regulating the valve action whereby the gaseous mixture feed stream is passed cyclically and in alternating sequence through each of the two fractionating zones.

Compared with the conventional two-zone "heatless" apparatus for adsorptive fractionation of gaseous mixtures, that of the present invention allows the fractionating operation to be conducted more easily in accordance with the demand for a concentrated or purified gaseous product at the point of consumption. The nature and substance of this invention may be more clearly perceived and fully understood by reference to the following description and claims taken in connection with the accompanying drawings in which:

Figure 1:
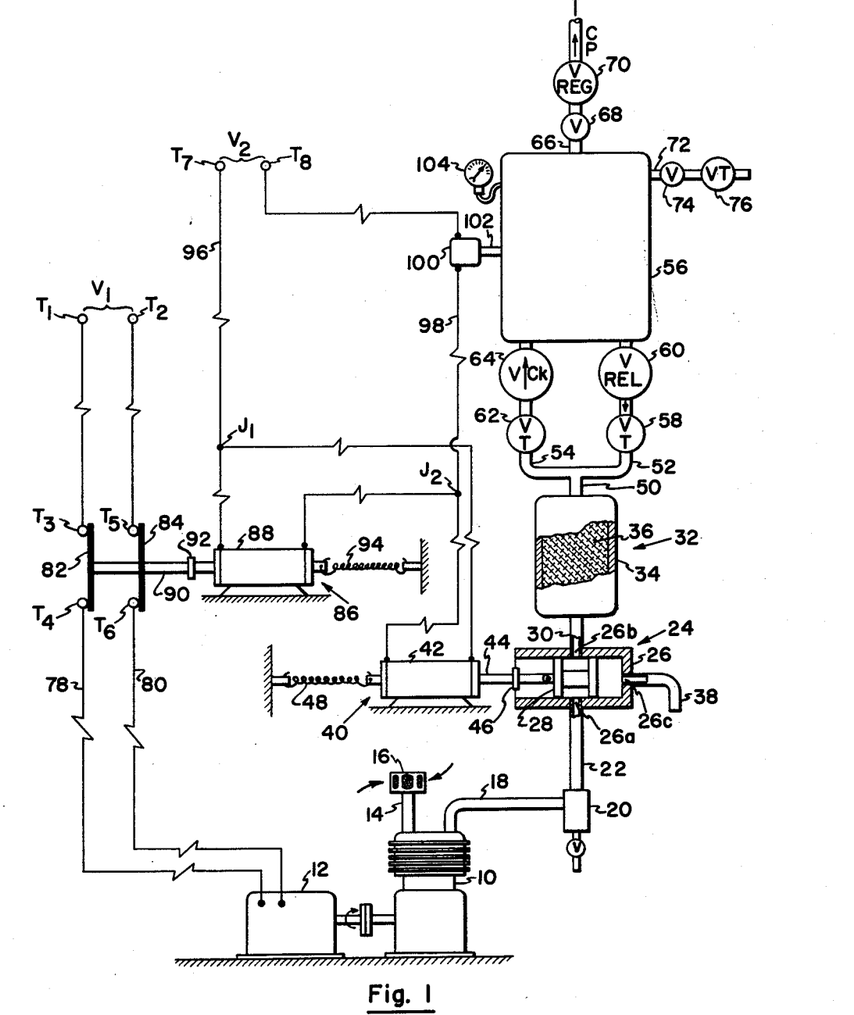
FIG. 1 represents a partly structural and partly schematic view of an apparatus embodiment of this invention with electrical switches and mechanical valve equipment thereof positioned for an adsorption cycle of the single fractionating zone of the apparatus.

Referring now to the drawings in detail, especially to FIG. 1 thereof, an air compressor 10 driven by an electric motor 12 is provided with a suction conduit 14, a suction filter 16, and a discharge conduit 18. This discharge conduit extends from the compressor to a trap or separator 20 wherein any gross amounts of liquids such as water vapor condensate and excessive cylinder lubricant carried over in the discharge air stream are removed from this stream. Trap 20 may be manually or automatically drained from time to time. In any event, it may be a fully conventional device suitable for the purpose indicated, and its particular design forms no part of the present invention.

A high pressure air conduit 22 serving as a continuation of discharge conduit 18 extends from the air outlet side of trap 20 to one part of a valve structure 24 comprising a casing or body 26 and a piston 28. Casing 26 is provided with three ports, 26a, 26b, and 26c. High pressure air conduit 22 is connected to the valve casing at port 26a. From port 26b a gaseous mixture or high pressure air supply and secondary effluent discharge conduit 30 extends to the fractionating zone 32 of the illustrated apparatus. This zone comprises a container vessel 34 at least partially filled with an adsorbent material 36. The nature of adsorbent zone 32, especially that of adsorbent material 36, will be described more completely hereinafter. Still considering valve casing 26, the remaining port thereof which is port 26c is provided with a vent conduit 38 opening to the atmosphere or other region of relatively low pressure.

Valve piston 28 has diametrally enlarged end portions and a diametrally reduced central portion. Its end portions fit closely within the bore of valve casing 26, and may be provided with compressible rings or other suitable means for effecting an essentially gas-tight seal against the interior surface of the valve casing. As it is shown in FIG. 1, valve piston 28 is positioned to permit air or gas flow between ports 26a and 26b, that is, between conduits 22 and 30, but to prevent flow from either port 26a or 26b to port 26c, that is, from either conduit 22 or 30 to conduit 38.

Operation of valve 24 is effected at least in part by electric solenoid 40. This solenoid comprises a coil member 42, a plunger member 44, and a stop collar 46 on the plunger. Coil 42 is substantially fixed in space relative to valve casing 26. At its end adjacent stop collar 46, plunger 44 is conected to valve piston 28 in any manner suitable to allow the plunger to both push and pull on the piston. At its end removed from stop collar 46, plunger 44 is connected to one end of tension spring 48 which is anchored at its other end to suitable foundation structure. As it is shown in FIG. 1, solenoid coil 42 is intended to be energized electrically with plunger 44 having been drawn into the coil against the force of spring 48.

From the end of vessel 34 of fractionating zone 32 opposite that at which conduit 30 is connected, there extends a primary effluent discharge and reflux inlet conduit 50. This latter conduit divides into two branches 52 and 54, each of which is connected to an accumulator drum or chamber 56. In branch conduit 52 there is a throttle valve 58 and a relief valve 60 with the latter being the closer to the accumulator. In branch conduit 54 there is a throttle valve 62 and a check valve 64 with the latter being the closer to the accumulator.

Throttle valves 58 and 62, assuming they are at least partially open, will permit air or gas flow through themselves in either direction depending upon the direction of the gas pressure differences across them. Relief valve 60 is disposed to open or relieve only when the pressure on its side adjacent accumulator 56 is some determined amount greater than that on its side adjacent fractionating zone 32, for example, 50 p.s.i. greater. Valve 60 may reseat or go closed to shut off flow in branch conduit 52 at the same or lower pressure difference than that which causes it to open. Check valve 64 is disposed to permit air or gas flow through itself only in the direction from fractionating zone 32 to accumulator 56. This check valve may be lightly spring-loaded to insure its closing in the absence of a pressure difference across it such that the pressure below valve 64 in the position illustrated is greater than that above it. For purposes of this invention, however, it is not required that check valve 64 call for more than only a very slight pressure difference of appropriate direction to permit air or gas flow through itself and branch conduit 54.

Extending outwardly from accumulator chamber 56 is a product draw-off conduit 66. This conduit may be connected by any suitable means to whatever device or system it is which is to be supplied with dry air or other purified gas generated by the apparatus of this invention. A stop valve 68 and a regulating valve 70 intended to maintain a constant pressure on its outlet side are located in draw-off conduit 66 fairly closely adjacent the accumulator chamber. Stop valve 68 is intended to be either fully open or fully closed. Regulating valve 70 will conveniently be of an adjustable nature to allow maintenance of constant pressure over a range of pressures on its downstream or outlet side, assuming of course that pressure sufficient for the purpose is maintained in accumulator chamber 56, and that stop valve 68 is open. An exemplary pressure within this range of pressures might be 30 p.s.i.g.

Also extending outwardly from accumulator chamber 56 is a vent or bleed conduit 72. This conduit opens to the atmosphere similarly to vent 38 from solenoid-operated valve 24, and has a stop valve 74 and a throttle valve 76 located in it. Stop valve 74 is intended to be either fully open or fully closed. Throttle valve 76 may be adjusted to establish a desired rate of gas venting from accumulator 56 depending upon the pressure within the accumulator chamber, and assuming of course that stop valve 74 is open. The purpose of vent conduit 72 and its included valves 74 and 76 is to facilitate conditioning of bed of absorbent material 36 in fractionating zone 32, as will be explained more fully hereinafter.

Current flow for operation of motor 12 is furnished by voltage $V_1$ applied across terminals $T_1$ and $T_2$ of motor leads 78 and 80. Intermediate terminal $T_1$ and motor 12, lead 78 is discontinuous across terminals or switch points $T_3$ and $T_4$. Correspondingly, lead 80 is discontinuous across terminals or switch points $T_5$ and $T_6$. For energization of motor 12, closure is effected across switch points $T_3$ and $T_4$ by switch bar 82, and across switch points $T_5$ and $T_6$ by switch bar 84. These switch bars are operated to open and close across the switch points in leads 78 and 80 by means of an electric solenoid 86. This solenoid comprises a coil member 88, a plunger member 90, and a stop collar 92 on the plunger. Coil 88 is substantially fixed in space relative to switch points $T_3$, $T_4$, $T_5$ and $T_6$. At and near its end adjacent stop collar 92, plunger 90 has switch bars 82 and 84 fitted upon it. At its end removed from stop collar 92, plunger 90 is connected to one end of tension spring 94 which is anchored at its other end to suitable foundation structure. As it is shown in FIG. 1, solenoid coil 88 is intended to be energized electrically with plunger 90 having been drawn into the coil against the force of spring 94.

Current flow for operation of both solenoids 40 and 86 is furnished by voltage $V_2$ applied across terminals $T_7$ and $T_8$ of main solenoid leads 96 and 98. These leads divide at junctures $J_1$ and $J_2$ respectively, and from there extend to solenoid coils 42 and 88 to connect these coils in parallel across terminals $T_7$ and $T_8$. Intermediate terminal $T_8$ and juncture $J_2$, lead 98 is discontinuous across the internal terminals or switch points of a pressure switch 100 which is in gas pressure communication with accumulator chamber 56 through a short conduit or pipe nipple 102.

Pressure switch 100 is of a kind well known in the art having a switch bar which is normally closed across the internal points until a certain relatively high pressure is exerted on the switch, and which then snaps open across the points and remains open until pressure on the switch is reduced to a certain relatively low value, at which low value of pressure it closes across the points again. In an actual case, the opening pressure of switch 100 might be 80 p.s.i.g. and its closing pressure might be 40 p.s.i.g.

Desirably the opening and closing pressures of switch 100 will be controllably variable. More desirably they will be controllably variable independently of each other. As it is shown in FIG. 1, pressure switch 100 is intended to be closed across its internal terminals with pressure in accumulator 56 rising as electric motor 12 drives air compressor 10 steadily, and primarily effluent gas arrives in the accumulator through branch conduit 54 at a greater mass flow rate than that at which gas leaves the accumulator through product conduit 66, vent stop valve 74 assumed to be closed. Desirably, although not essentially for this invention, there will be a pressure gauge 104 on accumulator chamber 56.

Figure 2:
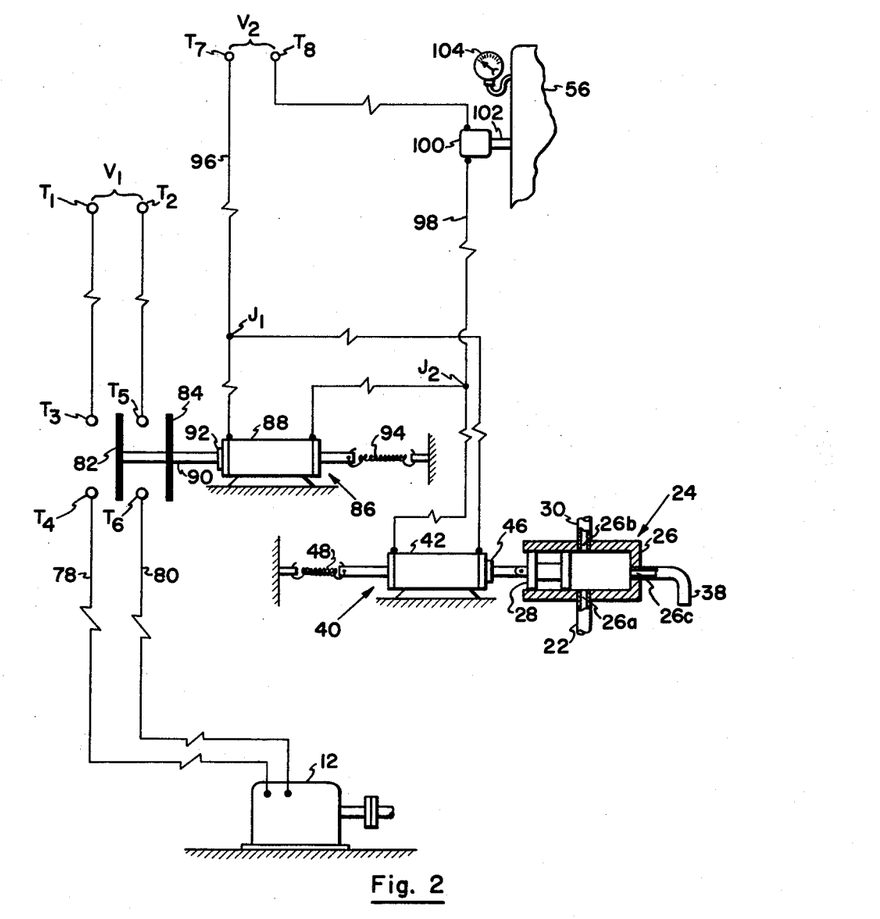
FIG. 2 represents the electrical switches and mechanical valve equipment of the apparatus of FIG. 1 positioned for a desorption cycle of the single fractionating zone of the apparatus.

To continue with the description of the electrical system of the illustrated apparatus, imagine that gas pressure in accumulator drum 56 has risen to the level of the opening pressure of switch 100. When this switch snaps open the current to solenoid coils 42 and 88 will be interrupted, and tension springs 48 and 94 will be able to pull solenoid plungers 44 and 90 to the left and right respectively until motion of these plungers is halted by their stop collars 46 and 92, and the conditions of FIG. 2 are achieved. Referring to FIG. 2 in contrast to FIG. 1, it may be seen that solenoid plunger 44 has moved valve piston 28 far enough to the left to place both valve ports 26a and 26b in communication with port 26c, and hence in communication with the atmosphere through vent conduit 38. It may be seen also that by its motion to the right, solenoid plunger 90 has opened switch bar 82 across terminals $T_3$ and $T_4$ and switch bar 84 across terminals $T_5$ and $T_6$.

With valve ports 26a and 26c in communication, gas pressure on the discharge side of compressor 10 will be relieved as conduit 22, trap 20, and conduit 18 blow down to the atmosphere. The compressor itself will have stopped turning because of interruption of electric power to motor 12 upon the opening of switch bars 82 and 84 across their respective pairs of switch points in leads 78 and 80. Likewise, with valve ports 26b and 26c in communication, gas pressure on pressure switch 100 exerted from accumulator 56 through nipple 102 will be relieved as conduit 30, fractionating zone 32, conduit 50, conduit 52 and the valves in it, and the accumulator chamber also blow down to the atmosphere.

Blowdown of accumulator 56 through conduit 52 will continue for as long as there is sufficient pressure difference across relief valve 60 to keep this valve open. Once this valve has closed, gas may still continue to escape from the accumulator chamber through product draw-off conduit 66 causing further reduction of pressure in this chamber. Eventually a relatively low level of pressure will be reached in accumulator 56 at which pressure switch 100 will go closed, and the circuit for current flow through solenoid coils 42 and 88 will be completed again. With these coils energized the conditions of FIG. 1 will be restored; that is, solenoid plunger 44 will move valve piston 28 to the right to put valve ports 26a and 26b in communication only with each other, and solenoid plunger 90 will move switch bars 82 and 84 to the left upon their respective pairs of switch points to energize motor 12 and commence operation of air compressor 10.

The structure of fractionating zone 32 will now be considered in some detail. As aforesaid, this zone comprises a container vessel 34 at least partially filled with an adsorbent material 36. This material may be any substance which has a selective affinity for at least one of the components of a gaseous mixture supplied to the fractionating zone by way of conduit 22, valve 24, and conduit 30. Adsorbent material 36 may be in the form of a continuous bed of a single substance throughout substantially the full interior region of vessel 34. Alternatively, the container vessel may be packed with a plurality of different adsorbent materials disposed in layers, one above another. In such an arrangement, it may be desirable that adjacent layers be physically separated as by grids or perforated plates fitted in container vessel 34.

Depending upon the gaseous mixture intended to be fractionated, and the particular concentrated or purified product desired, the adsorbent material employed may be selected from such substances as activated carbon, activated alumina, silica gel, etc. Various chars, clays, metal oxides, etc. also have adsorbent characteristics which may be utilized in and acccording to the apparatus and method of the present invention.

Still other substances suitable for use as adsorbent material 36 according to the present invention include substances known at least colloquially as "molecular sieves." This class of substances comprises certain zeolites, both natural and synthetic, which have crystalline structures characterized by a large number of small cavities connected one with another by a multiplicity of still smaller interstitial passages of exceptionally uniform diameter or bore for a given zeolite.

In recognition of this uniformity, a molecular sieve material may be and indeed customarily is designated by the characteristic diameter of its interstitial passages. This diameter will usually be in the range of about 3 to about 15 angstroms. The use of at least some zeolites as adsorbent materials for the fractionation of gaseous mixtures is discussed in the article "Molecular Sieves" by D. W. Breck and J. V. Smith appearing at pp. 85–94 of the Scientific American, vol. 200, No. 1, January 1959.

Of the molecular sieve substances contemplated for use as adsorbent material 36 of fractionating zone 32 of the illustrated apparatus embodiment of the present invention, one having an essentially uniform interstitial passage diameter of about 4 angstroms (4 A.) has been found especially suitable for effecting concentration of nitrogen in a primary effluent product derived from atmospheric air. Correspondingly, 5 A. and 13 A. substances have been used successfully for the concentration of a primary effluent product rich in oxygen from atmospheric air.

Each of these molecular sieve substances is also adsorptive of water vapor and, to some extent, of carbon dioxide. Accordingly, the primary effluent product derived from a feed stream of atmospheric air by the use of these substances will not only be rich in either oxygen or nitrogen depending on the substance used as adsorbent material 36, but will also be dry.

Molecular sieve substances still further exhibit selective affinities for various hydrocarbons. Thus they may be used effectively for removing oil vapors from air streams. An example of this would be their use to remove cylinder lubricating oil vapors from air discharged from compressor 10.

Besides the molecular sieves, there are many substances suitable for use as adsorbent material 36 in the apparatus and according to the method of the present invention which are selective of more than only one key component. For example, activated alumina may be employed to adsorb water vapor and carbon dioxide simultaneously from a gaseous mixture stream fed to fractionating zone 32 through conduit 30. On the other hand, silica gel is adsorptive of water vapor but has very little affinity for carbon dioxide.

Operation of the illustrated apparatus for the adsorptive fractionation of a gaseous mixture, specifically for the adsorpitive drying of air will now be described. Suppose initially that voltage $V_1$ has been applied across terminals $T_1$ and $T_2$, but that voltage $V_2$ has not yet been applied across terminals $T_7$ and $T_8$; that throttle valves 58, 62, and 76 are each at least partially open; that stop valve 66 is shut, and that stop valve 74 is open.

Suppose further that relief valve 60 and pressure switch 100 are so set that the pressure difference required to cause opening of the relief valve is less than the pressure elevation above atmospheric pressure required to cause opening of the pressure switch. For example, assume that relief valve 60 opens at a pressure difference of 50 p.s.i. while pressure switch 100 opens at a pressure of 80 p.s.i.g. Suppose still further that relief valve 60 and pressure switch 100 are so set that the greatest pressure difference at which closing of the relief valve will take place once this valve has opened is greater than the greatest pressure elevation above atmospheric pressure at which closing of the pressure switch will take place once this switch has opened. For example, assume that relief valve 60 closes at a pressure difference of 45 p.s.i. while pressure switch 100 closes at a pressure of 40 p.s.i.g. Suppose even still further that the pressure in accumulator chamber 56, if not essentially atmospheric pressure, is at least not greater than 40 p.s.i.g. Any positive pressure actually existing in the accumulator chamber will be decreasing steadily as gas under pressure escapes to the atmosphere through vent conduit 72.

With these conditions established, voltage $V_2$ is now applied across terminals $T_7$ and $T_8$ to energize solenoids 40 and 86. According to explanations given already, this energization will start motor 12 and air compressor 10, and align valve piston 28 in valve casing 26 as shown in FIG. 1. Air discharged from compressor 10 will flow into fractionating zone 32. This air will be at least somewhat moist; that is, the actual gaseous material flowing into the fractionating zone as a feed stream at a relatively high pressure will be a mixture of air and water vapor. The water vapor content of this mixture will be that part of the water vapor content of atmospheric air drawn into the compressor through filter 16 and suction conduit 14 which has not been, and indeed could not have been, removed from the air by the operation of trap 20. It will be preferable in any apparatus embodiment of this invention that the connections to fractionating zone 32 be oriented with respect to the zone, as they are shown in FIG. 1. That is, it will be preferable that the conduit such as conduit 30 carrying relatively moist air or gas into the zone enter it at the bottom while the conduit such as conduit 50 carrying relatively dry reflux gas into the fractionating zone enter it at the top.

As the mixture of air and water vapor flows into fractionating zone 32, the water vapor content thereof will begin to be taken up by adsorbent material 36 which will in this case, of course, comprise a substance such as silica gel having a selective affinity for water vapor as a key component. The non-adsorbed portion of the gaseous mixture will flow through and out of vessel 34 wherein adsorbent material 36 is contained, through conduits 50 and 54 and valves 62 and 64 in the latter conduit, and will finally enter accumulator chamber 56. Throttle valve 62 should be sufficiently restrictive of flow that in pumping against is compressor 10 will build up rapidly to its rated discharge pressure. This will place adsorbent material 36 under relatively high pressure quite soon after the start of operations, a circumstance desired for the adsorption cycle of fractionating zone 32.

With continued operation of air compressor 10, air or gas pressure will rise in accumulator chamber 56 as the primary effluent stream of air from the fractionating zone enters through conduit 54. At the same time, of course, there will be some loss of air from the accumulator chamber through vent conduit 72, stop valve 74 therein being fully open and throttle valve 76 being at least partially open. The compressor, valve, and conduit elements of the sytsem will be so sized, however, and the several valves will be so adjusted that during an adsorption cycle as now being described the mass rate of air inflow to accumulator chamber 56 through conduit 54 will be considerably in excess of the mass rate of air outflow from the accumulator chamber through conduit 72. There will be no air inflow to the accumulator chamber through conduit 52 because of the disposition of relief valve 60 in this conduit. Likewise, there will be no air outflow from accumulator chamber 56 at this time through product draw-off conduit 66 because of stop valve 68 in this conduit being fully closed.

As a net air inflow to accumulator chamber 56 continues, a pressure of 80 p.s.i.g. will be reached therein which will cause pressure switch 100 to snap open, de-energizing solenoids 40 and 86. According to explanations given already, this de-energization will stop motor 12 and air compressor 10, and align valve piston 28 in valve casing 26 as shown in FIG. 2. The discharge side of compressor 10 will blow down or unload itself to the atmosphere through vent conduit 38. Fractionating zone 32 will also commence to blow down through this conduit, starting the desorption cycle of adsorbent material 36.

During the whole of the desorption cycle there will be no reflux flow of air or gas into fractionating zone 32 from accumulator chamber 56 through conduit 54 because of the disposition of check valve 64 in this conduit. Likewise, during an initial part of the desorption cycle there will be no reflux flow into the fractionating zone through conduit 52. Flow of gas through the latter conduit from the accumulator chamber will not start until fractionating zone 32 has blown down to a sufficiently low level of pressure in respect of the pressure level in the accumulator chamber to provide the difference in pressure of 50 p.s.i. across relief valve 60 needed to cause this valve to open.

After relief valve 60 does open, there will be a considerable reflux flow of air from accumulator 56 through conduits 52 and 50, into and through adsorbent material 36 of fractionating zone 32, through conduit 30 and valve 24, and finally through vent 38 to the atmosphere. This reflux air flow will have a backwashing or purging effect on adsorbent material 36 to desorb and remove key component material, that is, water vapor, which was adsorbed thereupon during the adsorption cycle just preceding. Throttle valve 58 should be sufficiently restrictive of flow that upon the opening of relief valve 60 there will be no heavy pressure surge from accumulator chamber 56 into adsorbent material 36 of the fractionating zone 32, and thereafter during the time that the relief valve is open that only comparatively low differences in pressure will exist from end to end of the bed of adsorbent material. In this way the adsorbent bed will be backwashed by a large volume of reflux gas at a relatively low average pressure.

Throughout the whole of the desorption cycle so far described, air pressure in accumulator chamber 56 will be falling. It will fall initially, that is, from the time that valve piston 28 is shifted to the left and compressor 10 is stopped until relief valve 60 in conduit 52 opens, because of the escape of air through vent conduit 72. During the period that the relief valve is open, pressure in the accumulator chamber will fall due to flow through both conduits 52 and 72. After there is no longer the difference in pressure of 45 p.s.i. between accumulator chamber 56 and fractionating zone 32 needed to keep relief valve 60 open, flow of reflux gas from the accumulator chamber will stop. Flow of gas through vent conduit 72 will continue, however, causing further reduction of air pressure in accumulator chamber 56.

This reduction will go on until air or gas pressure in the accumulator chamber has fallen to 40 p.s.i.g. so that pressure switch 100 is allowed to close, energizing solenoids 40 and 86. According to explanations given already, energizing these solenoids will start motor 12 and air compressor 10, and align valve piston 28 in valve casing 26 as shown in FIG. 1 to begin another adsorption cycle. This adsorption cycle will be followed by a desorption cycle which will be followed by still another adsorption cycle, etc. As this cyclical operation continues, adsorbent material 36 of fractionating zone 32 will become conditioned for drying purposes just like the adsorbent material of either one of the zones of the conventional two-zone apparatus for "heatless" fractionation of gaseous mixtures.

Assuming that in the process of conditioning adsorbent material 36 the value of $F_R$ as hereinbefore defined exceeds the value of $F_T$ ($P_D/P_A$), the adsorbent material will approach a "super dry" state for a region extending from the end of container vessel 34 whereto primary effluent discharge and reflux inlet conduit 50 is connected. This assumes further, of course, that the system is so proportioned that cycle times are kept short enough to prevent occurrence of the phenomenon of "break through" described earlier in connection with the operation of the fractionating zones of the conventional two-zone apparatus.

At its lower end, according to FIG. 1, the "super dry" region will blend into another region of the adsorbent material having a moisture gradient. At its upper end, this gradient region will hold water vapor exerting only a vanishingly small pressure corresponding to the "super dry" state of the top part of adsorbent material 36. At its lower end, the gradient region will hold water vapor exerting a pressure substantially equal to the partial pressure of water vapor in the gaseous mixture feed stream supplied to the fractionating zone through conduit 30. From this lower end of the gradient region, a third region of the adsorbent material will extend to the end of container vessel 34 whereto high pressure air supply and secondary effluent discharge conduit 30 is connected. This third region or bottom part of adsorbent material 36 will hold water vapor exerting a pressure substantially uniformly equal to the partial pressure of water vapor in the high pressure gaseous mixture supplied for fractionation.

After the adsorbent material of fractionating zone 32 has been fully conditioned, the conditioning operation may be terminated simply by closing stop valve 74 in vent conduit 72. With this valve closed, assuming closure takes place with a pressure of at least 45 p.s.i.g. in the accumulator chamber, air pressure in accumulator chamber 56 cannot fall below 45 p.s.i.g., the accumulator pressure at which relief valve 60 will close for a pressure of atmospheric pressure in fractionating zone 32. At a pressure of 45 p.s.i.g. in accumulator chamber 56, a new adsorption cycle cannot be started. This is because once pressure switch 100 has been opened, it will be held open for any pressure in the accumulator chamber in excess of 40 p.s.i.g. After vent stop valve 74 has been closed, therefore, the illustrated apparatus will come to rest in the condition shown in FIG. 2 with a 45 p.s.i.g. charge of gas in accumulator chamber 56. The partial pressure of water vapor in this gas will be vanishingly small, essentially zero. In other words, the gas charge in the accumulator chamber will be essentially absolutely dry air. Measurement of moisture content of gas bled from accumulator chamber 56 through vent conduit 72 will provide an indication of the state of conditioning of the bed of adsorbent material 36.

Conditioning of the adsorbent material of fractionating zone 32 may be accelerated, and loss of air through vent conduit 72 prevented if relief valve 60 and pressure switch 100 are so set that the greatest pressure difference at which closing of the relief valve will take place once this valve has opened is less than the greatest pressure elevation above atmospheric pressure at which closing of the pressure switch will take place once this switch has opened. For example, assume that relief valve 60 closes at a pressure difference of 35 p.s.i. while pressure switch 100 closes at a pressure of 40 p.s.i.g. In this circumstance no venting or bleeding of gas from the accumulator chamber will be needed to bring the pressure in accumulator chamber 56 down to 40 p.s.i.g. during a desorption cycle for closing of switch 100 to begin an adsorption cycle. Such pressure reduction will be effected entirely by loss of gas from the accumulator chamber through relief valve 60.

On the other hand, with the closing pressure difference of the relief valve set down to 35 p.s.i. the apparatus will run indefinitely after full conditioning of adsorbent material 36 is achieved even though no product gas is being drawn off through conduit 66, unless relief valve 60 is readjusted to a higher pressure difference for closing or electric power to the system is interrupted as by removal of voltages $V_1$, $V_2$, or both. It would be possible, of course, to effect adjustments on pressure switch 100 instead of relief valve 60 to do without air bleed during conditioning or shut off the apparatus after completion of conditioning of the bed of adsorbent material. Parallel valve and switch arrangements, individual valves and switches thereof having different settings and suitable isolating means, could also be provided to suit requirements of conditioning and standby after conditioning.

While these alternate possibilities exist, however, the method of conditioning adsorbent material 36 which calls for use of vent or bleed conduit 72 is generally deemed preferable as being simple, reliable, and not unduly wasteful of compressed air or gas.

To continue with the description of the operation of the illustrated apparatus for the adsorptive fractionation of a gaseous mixture, it will be assumed that adsorbent material 36 of the fractionating zone 32 has been conditioned by the method stated to be preferable, that is, by the method employing vent conudit 72. Likewise, as stated, the apparatus will be at rest in the condition shown in FIG. 2 with a 45 p.s.i.g. charge of gas in accumulator chamber 56. Product withdrawal may now be started. This is done by opening stop valve 68 in product draw-off conduit 66, and setting the adjustment of regulating valve 70 in this conduit to give a particular desired pressure on the downstream side of this valve.

Suppose that regulating valve 70 is set to maintain a substantially constant pressure of about 30 p.s.i.g. in the device or system to which conduit 66 is connected. Pressure in accumulator chamber 56 will fall as dry air is drawn off from it through conduit 66. When pressure in the accumulator chamber has fallen to 40 p.s.i.g., pressure switch 100 will snap closed on its internal terminals to complete the electrical circuits for solenoids 40 and 86. Energizing these solenoids by application of voltage $V_2$ across their coil members 42 and 88 will start motor 12 and air compressor 10, and align valve piston 28 in valve casing 26 as shown in FIG. 1 to begin another adsorption cycle.

With continued operation of air compressor 10, accumulator chamber 56 will receive a stream of dry, primary effluent air from fractionating zone 32 through branch 54 of conduit 50. Assuming that the mass rate of flow of air drawn off from the accumulator chamber through conduit 66 is less than that of air flowing into this chamber through conduit 54, pressure will rise within accumulator chamber 56, eventually reaching 80 p.s.i.g. When this pressure has been achieved, pressure switch 100 will snap open to interrupt the electrical circuits for solenoids 40 and 86. Deenergizing these solenoids will stop motor 12 and air compressor 10, and align valve piston 28 in valve casing 26 as shown in FIG. 2. The discharge side of compressor 10 will blow down or unload itself to the atmosphere through vent conduit 38. Fractionating zone 32 will also commence to blow down through this conduit, starting another desorption cycle of adsorbent material 36.

In the course of this desorption cycle, relief valve 60 in conduit 52 will open where the pressure difference across it reaches 50 p.s.i., and allow dry air to flow back as a reflux stream from accumulator chamber 56 into and through the adsorbent material of fractionating zone 32. Once having opened, the relief valve will not close again until the pressure difference across it has fallen to 45 p.s.i. Throughout the entire desorption cycle, air will be leaving accumulator chamber 56 as a product through conduit 66, assuming that there is a steady demand for dry air at the device or system to which conduit 66 is connected.

During the whole of the desorption cycle, air or gas pressure in the accumulator chamber will be falling. Still assuming that there is a steady demand for a dry air product stream, air pressure will fall initially due to product removal from accumulator chamber 56, then due to both product draw off and the outflow of reflux air after the relief valve opens, and finally due only to product removal after the relief valve closes until air pressure in the accumulator chamber has been lowered to 40 p.s.i.g. When this latter pressure has been reached, pressure switch 100 will snap closed once more to complete the electrical circuits for solenoids 40 and 86. This will cause still another adsorption cycle to be started.

It was stated earlier in this specification that according to the present invention an apparatus for "heatless" fractionation of gaseous mixtures is provided in which only a single fractionating zone comprising a bed of adsorbent material is employed, but which, like the conventional two-zone apparatus, is capable of yielding a steady stream of a concentrated or purified gaseous product. From the detailed description of the structure shown in FIGS. 1 and 2, and its preferred mode of operation, it is evident that an apparatus of the kind recited has in fact been provided.

It was stated still earlier that this invention relates to an apparatus and method for fractionation of gaseous mixtures characterized by the employment of only an intermittently flowing stream of the gaseous mixture to be fractionated. That this relation does obtain is clear from the intermittent operation of air compressor 10 described above, which means an intermittent stream of relatively moist, realtively high pressure air arriving at fractionating zone 32 through conduit 30. It should be noted particularly that this stream is only intermittent, within the scope of previously described operating conditions, even though the dry product air stream withdrawn through conduit 66 is continuous.

It was also stated earlier that together with the pressure-sensitive switch mounted thereon, the air or gas accumulator of the apparatus embodiment of this invention itself acts as a cycle timing device as well as a gas storage means. Such timing action of accumulator chamber 56 and pressure switch 100 will be understood when one considers that the electrical energization and deenergization of solenoids 40 and 86, and hence the position taken by piston 28 in valve casing 26 and the starting and stopping of air compressor 10 are all determined by and changed from time to time according to the level of pressure in the accumulator chamber for given closing and opening settings of the pressure switch.

Additionally it was stated that compared with the conventional two-zone "heatless" apparatus for adsorptive fractionation of gaseous mixtures, that of the present invention allows the fractionating operation to be conducted more easily in accordance with the demand for a concentrated or purified gaseous product at the point of consumption. This may be demonstrated if one imagines that the illustrated apparatus is running to supply a continuous product stream of dry air at 30 p.s.i.g. on the downstream side of regulating valve 70 in draw-off conduit 66, and that the air requirement of the device or system to which conduit 66 is connected is suddenly and completely terminated. Suppose further that this termination occurs while the illustrated apparatus is operating in the course of an adsorption cycle.

In these circumstances, air compressor 10 will continue to operate until a pressure of 80 p.s.i.g. is achieved in accumulator chamber 56. Pressure switch 100 will then snap open, and a desorption cycle will be started. In the course of this desorption cycle, relief valve 60 will open to allow a reflux stream of dry air to flow from the accumulator chamber into fractionating zone 32, and later close with a pressure of substantially 45 p.s.i.g. in accumulator chamber 56 and a pressure of substantially atmospheric pressure or 0 p.s.i.g. in and around adsorbent material 36 of the fractionating zone. Operation of the apparatus will effectively cease at this point, that is, with the electrical switches and mechanical valve equipment positioned as shown in FIG. 2, and a 45 p.s.i.g. charge of dry air in the accumulator chamber. Operation will not be commenced again until there is a withdrawal of dry air through product conduit 66 sufficient to lower the pressure in accumulator chamber 56 to 40 p.s.i.g. and allow closing of pressure switch 100 for the start of another adsorption cycle.

If the termination of product removal through conduit 66 occurs while the illustrated apparatus is operating in the course of a desorption cycle, the apparatus may be in either one of two general circumstances at the moment of this termination. One is with a pressure of at least a little more than 45 p.s.i.g. in the accumulator chamber, and the other is with a pressure of less than 45 p.s.i.g. but at least a little more than 40 p.s.i.g. in this chamber. In the first of these circumstances, relief valve 60 will still be open at the moment a product stream ceases to be withdrawn from accumulator chamber 56. In the second, the relief valve will have already closed.

Taking the case of the first of these general circumstances, reflux flow from the accumulator chamber through relief valve 60 will continue until there is a pressure difference of only about 45 p.s.i. across this valve. Then the valve will close with a pressure of substantially 45 p.s.i.g. in accumulator chamber 56 and a pressure of substantially atmospheric pressure or 0 p.s.i.g. in fractionating zone 32. This will be the end of operation until product gas removal is renewed. In the case of the second general circumstance just described, operation will end immediately upon the termination of product removal, leaving accumulator chamber 56 with an internal pressure of dry air in the range 40–45 p.s.i.g.

It may be pointed out incidentally that the accumulator chamber could be left with an internal air or gas pressure in the range 40–45 p.s.i.g. at the end of the conditioning operation for adsorbent material 36 if stop valve 74 in vent conduit 72 were closed while the pressure in accumulator chamber 56 was in fact in this range. Closure of stop valve 74 with a pressure of at least 45 p.s.i.g. in the accumulator chamber has been assumed heretofore. What it is desired to point out particularly, however, is that upon termination of dry product gas removal through conduit 66 the illustrated apparatus will, at the most, continue to operate through only one adsorption cycle and one desorption cycle. Upon cessation of operation, the apparatus will rest with all electrical units such as motor 12 and solenoids 40 and 86 deenergized, the discharge side of compressor 10 blown down to atmospheric pressure, and a charge of dry gas in accumulator chamber 56 having a pressure at least a little greater than 40 p.s.i.g. The apparatus can rest in this condition indefinitely, being immediately ready at any and all times to supply a product stream of dry gas to the system or device to which draw-off conduit 66 is connected.

Considering the overall operation of the illustrated apparatus for the drawing off a gaseous product through conduit 66, it is essential that the average mass rate of product removal be less than that of air delivery into accumulator chamber 56 from compressor 10 and adsorbent zone 32 in the course of any adsorption cycle. If this requirement be not satisfied, pressure will not rise in the accumulator chamber to cause switch 100 to snap open for the starting of a desorption cycle. It is essential further that if the apparatus is to provide a product stream of substantially completely dry air, or indeed any product stream of a gas substantially completely freed of a selected key component, the rate of product removal be low enough to allow a reflux flow of gas through adsorbent material 36 sufficiently large that $F_R$ is at least equal to $F_T$ $(P_D/P_A)$, these terms as hereinbefore defined.

It is also within the contemplation of the present invention, however, that the illustrated apparatus be used to provide a product stream of less than substantially completely dry air, or, more generally, a product stream of a gas less than substantially completely freed of a selected key component. In this case the adsorbent material 36 of fractionating zone 32 will operate in a "broken through" condition so far as the key component is concerned. The rate of product removal will be low enough that there will be cyclical operation of pressure switch 100, but it will be sufficiently large that $F_R$ is less than $F_T$ $(P_D/P_A)$. So long as there is cyclical operation of switch 100 due to successively rising and falling pressure in accumulator chamber 56 to give some value of $F_R$ greater than zero, the product gas stream leaving the apparatus through conduit 66 will have an at least somewhat lower concentration of the key component than the high pressure gaseous mixture arriving at fractionating zone 32 through conduit 30.

Although this invention has been described with a certain degree of particularity, it is to be understood that the foregoing disclosure has been made only by way of example, especially in respect of numerical values, and that many changes in the details of construction and the combination and arrangement of parts shown in FIGS. 1 and 2 may be resorted to without departing from the spirit and scope of this invention as hereinafter claimed. A few such changes possible within the aforesaid spirit and scope will be pointed out for purposes of further example.

Piston-type valve 24, which is in effect a four-way valve, could be replaced with a four-way rotary plug valve for the same conduit arrangement at the lower or wet end of fractionating zone 32. In a different arrangement there could be two conduits at this lower end, one to carry high pressure gaseous mixture material into the fractionating zone, and the other to discharge low pressure secondary effluent material from this zone. These two conduits would replace the single conduit 30. The conduit for carrying a high pressure feed stream into fractionating zone 32 might contain a three-way valve which would allow the function of unloading the discharge side of air compressor 10 on a desorption cycle to be retained. This three-way valve would have an operating means such as solenoid 40, as would the stop valve which would be needed in the conduit for discharging the secondary effluent stream from the fractionating zone.

Air compressor 10 itself need not be associated only with the illustrated apparatus embodiment of this invention; that is, conduit 22 through which a high pressure gaseous feed stream is supplied to valve 24 and thence to the fractionating zone could simply be branched off of a high pressure air main which is maintained under pressure at all times by compressor 10 or other suitable means. In this case, with only the single conduit 30 connecting with the lower end of fractionating zone 32, solenoid 86 could be eliminated, and four-way valve 24 could be replaced with a three-way valve operated by solenoid 40.

Solenoids 40 and 86 themselves, while convenient and desirable for the services wherein they are employed, are not the only valve and switch actuating means which could be used. Hydraulic and pneumatic plungers or other suitable actuators functioning in response to the level of pressure in accumulator chamber 56 are within the contemplation of the present invention.

At the upper or dry end of fractionating zone 32 a single conduit 50 is shown extending upwardly for a ways, and then branching into two conduits, 52 and 54. Both conduits 52 and 54 could extend completely independently between accumulator chamber 56 and container vessel 34 defining fractionating zone 32. Throttle valve 58 in conduit 52 and throttle valve 62 in conduit 54 could both be orifices rather than valves, as could throttle valve 76 in vent conduit 72.

In a crude but nevertheless operable embodiment of this invention, contrary to connecting fractionating zone 32 and accumulator chamber 56 with two at least semi-independent conduits 52 and 54 containing valve elements as shown, the fractionating zone and the accumulator chamber could be connected by only a single, unbranched conduit containing a pressure reducing device such as an orifice or a throttle valve. In a more crude but nevertheless still operable embodiment, there would be no separately defined pressure reducing device in this single conduit, the conduit itself acting as something of a pressure reducing capillary.

Not only may the illustrated apparatus embodiment of this invention be varied in respect of many items of its structure, but also it may be varied in respect of its mode of operation to at least some extent. For example, it will be apparent to those skilled in the appropriate art upon reading this specification that if the illustrated apparatus can be made to yield a steady stream of dry product gas at an essentially constant pressure, it can also, with suitable changes in design and setting of some of the valve and switch elements, be made to yield either an intermittent product gas stream or a product stream of varying pressure, or one that is both intermittent and of varying pressure.

In addition to these variations in the structure and mode of operation of the apparatus embodiment of this invention shown in FIGS. 1 and 2, and others thereof which will suggest themselves upon a viewing of these figures and a reading of the foregoing description, it is desired to describe and discuss a particular embodiment of this invention which is deemed to be of an unobvious and highly useful nature, and of which an actual reduction to practice has been effected.

The embodiment considered to be especially novel is one in which the accumulator chamber contains at least some other parts associated with the apparatus of the invention, even to the extent, in a special circumstance, of containing the means whereby the gaseous mixture to be fractionated is compressed. According to the actual reduction to practice of this embodiment in each of two versions to be described and distinguished, the accumulator chamber comprises a cylindrical shell with two flat end plates. These plates are separable from the shell, but are held against it by at least one tie rod when the accumulator is in the assembled condition. Grooves are provided in the end plates for accommodating sealing rings to give gas-tight joints between these plates and the cylindrical member of the accumulator chamber assembly.

One of the end plates of the accumulator chamber assembly, the bottom end plate in the preferred orientation of the apparatus, is cored or drilled fairly far but not all the way across from the plate edge to provide a hole along a usually chordal line. This plate is also drilled or cored part way through in two places in its face intended to be an interior surface of the assembled accumulator chamber. In one place it is cored or drilled to provide a hole through this interior surface connecting with the aforementioned chordal hole at about the blind end thereof. In a second place it is cored or drilled to provide a hole through this interior surface connecting with the aforementional chordal hole at a point intermediate the length thereof. The end of this chordal hole in the edge of the bottom end plate is subsequently closed essentially gas tight by a threaded plug or other suitable means.

Two other holes, either chordal or radial, are cored or drilled part way across the bottom end plate of the accumulator chamber assembly from the edge of the plate. These holes are usually shorter than the first-mentioned chordal hole, and they terminate fairly close to the aforementioned second hole drilled or cored through the interior surface of the plate, the hole connecting with the first-mentioned chordal hole at a point intermediate its length. Additionally, third and fourth holes are cored or drilled part way through the end plate in its face intended to be an interior surface of the assembled accumulator chamber. One of these latter holes connects with one of the aforesaid shorter chordal or radial holes at about the blind end thereof, and the other connects with the other shorter chordal or radial hole at about its blind end.

The end of one of the shorter chordal or radial holes in the edge of the bottom end plate is threaded or otherwise prepared to receive a conduit member carrying relatively moist, relatively high pressure air from the discharge side of an air compressor or from a compressed air main as a gaseous mixture to be fractionated. The end of the other of the shorter chordal or radial holes in the edge of the bottom end plate may be left open to serve as an outlet for a secondary effluent stream, or it may be fitted with an open-ended conduit to serve as a vent conduit for this particular stream.

In each of the versions to be distinguished of the particular apparatus embodiment of the present invention now being described, the fractionating zone comprises a cylindrical container vessel or shell packed with an adsorbent material suitable for the gaseous fractionation desired to be carried out. It may, for example, be packed with silica gel for the removal of water vapor from air. The shell member of the fractionating zone will be at least somewhat shorter than the shell portion of the accumulator chamber, and it may be several times smaller in diameter than this latter shell portion. As it is assembled there are three access openings in the fractionating zone through which gaseous material can flow, one at the lower or bottom end of the zone and two at its upper or top end according to its installation in a preferred orientation. The fractionating zone is mounted on the aforedescribed bottom end plate, and extends substantially vertically upwardly from this plate with the access opening at the lower end of the zone being aligned with the hole in the end plate connecting with the first-mentioned chordal hole at about the blind end thereof.

One of the access openings of the fractionating zone at the upper end thereof is provided with an orifice and a check valve. This check valve is disposed to permit flow only in the direction from the interior of the fractionating zone into the surrounding interior region of the accumulator chamber, the pressure in the fractionating zone being at least slightly higher than that in the clear volume of the accumulator chamber. The other access opening at the upper end of the fractionating zone is provided with an orifice and a relief valve which is sometimes also designated a purge valve. This relief valve is disposed to permit flow only in the direction from the interior region of the accumulator chamber surrounding the fractionating zone into the fractionating zone itself, the pressure in the clear volume of the accumulator zone being some determined value higher than the pressure in the fractionating zone.

The two versions of the particular apparatus embodiment of the present invention now being described are distinguished on the basis of the nature of the high pressure air supply means off of which they are intended to operate. In one version, this apparatus is intended to operate off of its own, individually assigned air compressor. In another version, this apparatus is intended to operate off of a branch from a high pressure air main which is maintained under pressure at all times.

So far as these two versions are to be distinguished structurally, the one intended to operate off of its own, individually assigned air compressor will be considered first. On the face of the bottom end plate intended to be an interior surface of the assembled accumulator chamber there is mounted a three-way, solenoid-operated valve. One of the ports of this valve will be aligned with the hole in the end plate connecting with the first-mentioned chordal hole at a point intermediate its length. The other two ports of the three-way valve will be aligned with the holes in the end plate connecting with the shorter chordal or radial holes at about their blind ends.

The upper or top end plate of the accumulator chamber assembly of this version is provided with two through holes extending normal to its face intended to be an interior surface of the assembled accumulator chamber. On this face and in alignment with one of these holes there is mounted a pressure switch. The diaphragm element or pressure-sensitive member of this switch is exposd to two pressures, on the pressure existing within the clear volume of the accumulator chamber and the other the pressure of the atmosphere which is sensed through the aforementioned hole in the upper end plate with which the pressure switch is aligned. This switch will act to open or close its switch bar or contacting element across its internal electrical switch points depending upon the difference between the pressure in the accumulator and atmospheric pressure.

It is also contemplated, as a specific embodiment of the present invention, to employ timing means to actuate three-way valve 224. Thus in FIGURE 4, switch 200 can be disengaged from the circuit and in its place timing means 290 inserted. This timing means can be any suitable timer known to the art which will activate an electrical circuit at selectable intervals.

Also on the face of the upper end plate intended to be an interior surface of the assembled accumulator chamber of this first embodiment version, and in alignment with the other one of the aforementioned holes in this plate, there is mounted a pressure regulating valve. Gaseous material from the clear volume of the accumulator chamber flows into this regulating valve, through it, and out of the entire apparatus assembly through the hole in the upper end plate of the assembled accumulator chamber wherewith the pressure regulating valve is aligned. A draw-off conduit for a product gas stream may extend from the end of this hole in the outer face of the upper end plate.

It is to be understood that the pressure switch and the pressure regulating valve or either of them might be mounted on the bottom end plate or on the cylindrical shell member of the accumulator chamber. Indeed, for a reason that will appear, it will be particularly desirable to locate the pressure switch on the bottom end plate adjacent the solenoid-operated valve with the atmospheric connection of the switch being taken through this bottom plate. Space limitations imposed by the dimensions of any particular apparatus may, however, require the pressure switch to be mounted on the upper end plate as aforesaid.

There will, of course, be electrical leads extending to and from the pressure switch. These will preferably run within the accumulator chamber between the pressure switch and both the solenoid element of the three-way valve and a multi-prong external connector fitted in gastight fashion in one of the end plates of the accumulator chamber assembly. With other items of structure located as aforesaid and assuming the pressure switch to be on the bottom end plate, it will be most convenient to have this connector fitted in the bottom end plate also. If such arrangement be possible, all electrical items and the devices to which they are wired will be on a single end plate. This will make for ease of assembly and disassembly of the whole apparatus.

The wiring plan of this first version of the particular apparatus embodiment of the present invention now being described will have the solenoid element of the three-way valve and a first pair of the prongs of the external connector wired in parallel across one side of the pressure switch. From a second pair of prongs of the external connector, leads will extend to the other side of the switch. Connection will be made from the first pair of prongs to the start, stop, and unloading mechanism of the air compressor supplying a gas mixture stream to the apparatus embodiment of this invention for fractionation. Connection will be made to the second pair of prongs from an electrical power supply corresponding to that furnishing voltage $V_2$ across terminals $T_7$ and $T_8$ in FIG. 1.

As an additional item of structure, the accumulator chamber may be provided with a vent or bleed conduit such as 72 shown in FIG. 1. This conduit and any appropriate valve means associated with it will be for purposes of conditioning the adsorbent material within the fractionating zone of the apparatus. It will be most conveniently located in one of the end plates of the accumulator chamber, but may be located in the shell member of this chamber without any impairment of its function.

Figure 3:
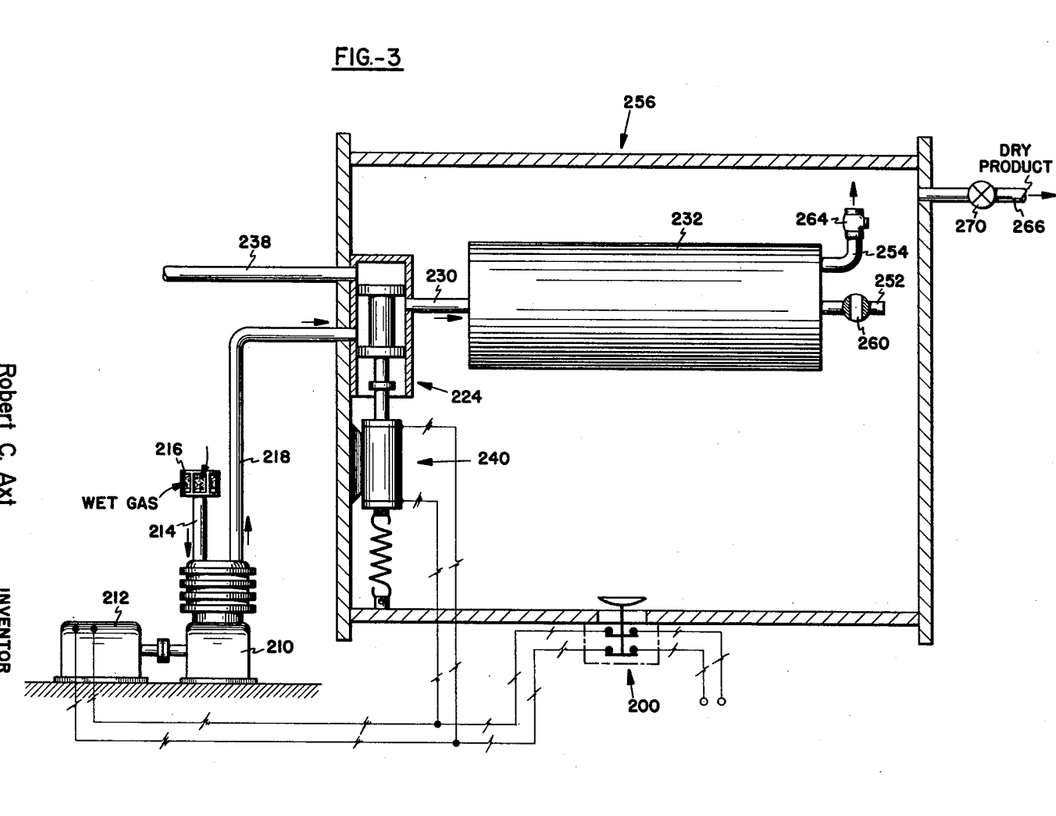
FIGURES 3 and 4 are schematic diagrams showing a modification of the instant invention wherein the accumulator chamber contains various parts of the associated apparatus.
Figure 4:
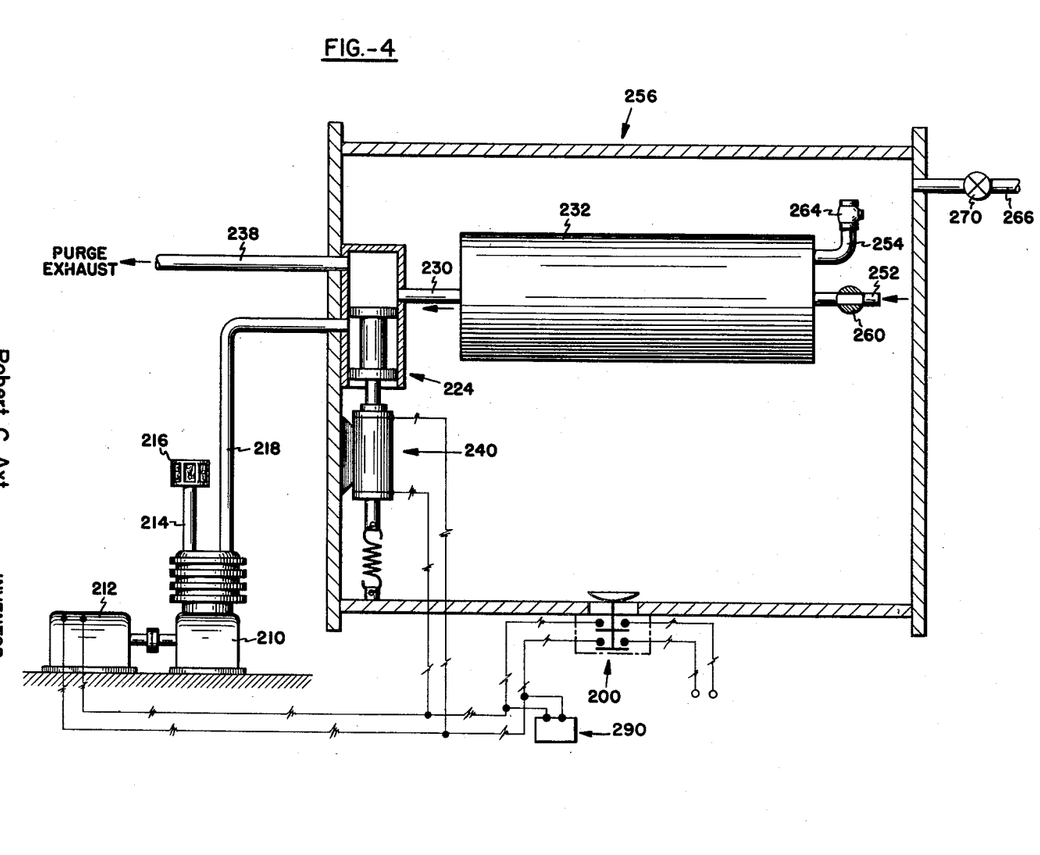

FIGURES 3 and 4 represent a schematic diagram of the above-described first version of the apparatus. FIGURE 3 shows the apparatus when feed is being introduced during the adsorption step of the cycle, while FIGURE 4 shows the purge step. During the adsorption step, wet gas from the atmosphere is drawn in through suction filter 216 and line 214 into air compressor 210. This compressor is driven by electric motor 212. The compressed moist air passes through line 218 into the three-way solenoid operated valve 224 and thence through line 230 into the fractionating zone 232 which contains a suitable adsorbent. The moisture is removed from the air stream by the adsorbent in fractionating zone 232, and essentially dry air passes out line 254 through check valve 264. This air flows into the accumulator 256 and increases the pressure therein. Dry product may be removed through regulating valve 270 via draw-off conduit 266. During this adsorption cycle, the pressure in the accumulator chamber 256 is sufficiently low so as to allow pressure switch 200 to be closed. When this switch is in the closed position, current passes to motor 212, which drives the compressor, and solenoid valve 242 is actuated as shown. When the pressure in accumulator chamber 256 reaches a predetermined high pressure, pressure switch 200 opens, thereby shutting off the compressor and permitting the solenod operated valve 224 to assume the position shown in FIGURE 4. This commences the purging step. During this step, a portion of the dry air in accumulator chamber 256 flows through conduit 252 and valve 260 in reverse flow through the fractionating zone 232. Valve 260 performs the same function as described previously for valve 60. No material passes through line 254 since valve 264 does not permit material to pass from the accumulator tank 256 back into the fractionating zone 232. With the three-way solenoid operated valve 226 in the position shown in FIGURE 4, line 230 is connected to the atmosphere through purge conduit 238, thereby reducing the pressure in zone 232. As the dry gas passes through fractionating zone 232, it purges the moisture from the adsorbent and passes out of the system through line 238. During this stage of the cycle, the pressure in accumulator zone 256 decreases. However, dry product may still be obtained through draw-off conduit 266.

When the pressure in accumulator zone 256 reaches a predetermined low pressure, pressure switch 200 again closes, thereby resuming the adsorption step.

The second of the two versions of the particular apparatus embodiment of the present invention now being described, the one intended to operate off of a branch from a high pressure air main which is maintained under pressure at all times, will be considered next. In this version, a version of extreme simplicity, there is no electrical equipment. The three-way valve is present as in the first version, but in this second version this valve is operated directly by a pressure-sensitive mechanism generally similar to that mechanism in the pressure switches described hereinbefore. The diaphragm or other sensitive element of this mechanism is exposed on one side to the pressure existing within the clear volume of the accumulator chamber and on the other to the pressure of the atmosphere. With the major exception noted, that is, the absence of electrical equipment, the second version of the apparatus being particularly described is generally similar to the first. At least some possible modes of operation of both versions will be apparent from the description of those of the apparatus of FIGS. 1 and 2 given earlier in this specification.

From the description just foregoing, it will be seen that in either version an extremely compact apparatus embodiment of the present invention may be provided. Essentially all that will be visible externally, at the most, will be an accumulator chamber with conduit and wire connections extending to and from it. Such a compact embodiment will be very easy to handle in shipment and installation. Ease of handling, however, is not the only outstanding value of this embodiment. What is at least as valuable and possibly more so is the degree of packaged protection which the accumulator chamber assembly will provide for such parts as the solenoid-operated valve, the pressure switch, and the pressure regulating valve. All of these parts would have to be separately packaged for protection sufficient to satisfy the very rigorous specification MIL–E–5272A of the Department of Defense if they were laid out individually or "breadboarded" according to FIG. 1.

Specification MIL–E–5272A dated 16 September 1952, has within its scope the establishment of uniform procedures for testing aeronautical and associated equipment under simulated and accelerated climatic and environmental conditions. Its scope takes in such test procedures as those for temperature shock, salt spray, fungus attack, rain, sand and dust, immersion, explosion, acceleration, etc. To meet all these tests, reasonably precise if not delicate electrical and mechanical switch and valve equipment would have to be well packaged individually indeed if laid out according to FIG. 1 When at least the greater part of this equipment is located within the accumulator chamber, however, it will be protected by an apparatus item which has a most important operational function, and thus no additional packaging structure or material will be needed. This will permit significant reductions in cost.

It may and should be noted also that the atmosphere in the interior of the accumulator chamber will be one of extremely dry air for the example given. This will be of a highly beneficial nature for preventing corrosion of electrical and mechanical parts mounted within the assembled accumulator chamber, and may allow these parts to be made of less costly, less inherently corrosion resistant materials than would otherwise be needed. The self-packaged apparatus for adsorptive fractionation of gaseous mixtures can, in effect, act to furnish its own preservative atmosphere. This will possibly eliminate the cost and inconvenience of providing at least one separate source of dry gas and conduit means for injecting this gas into the coverings of separated packaged apparatus elements not contained within their associated accumulator chamber.

As indicated earlier in this specification, the compressing means for the gaseous mixture to be fractionated may be packaged within the accumulator chamber of an apparatus embodiment of the present invention. It was indicated further that such packaging of the compressor would correspond to a special circumstance. The circumstance of a special nature for this purpose is that in which only a relatively very small rate of product gas flow is required, so small in fact that even the lowest capacity air or gas compressor available for use in generating this product will be required to run for only quite short and widely spaced periods of time. Said another way, even the lowest capacity compressor available will be idle much more of the time than it will be operating, even with product gas being drawn off or at least having to be available to be drawn off during the whole time.

In this circumstance if the compressor, even including a motor drive means therefor, be located within the accumulator chamber it will give up relatively little heat to adjacent structure and the surrounding atmosphere within the accumulator chamber during its periods of operation, and such heat as it does give up will be dissipated quickly and essentially completely during the periods of compressor idleness. The accumulator chamber may be constructed of highly heat conductive material such as aluminum or brass and provided with extended surfaces in the form of fins to accelerate this dissipation which will, of course, be at least started during the periods of compressor operation. Accordingly, in the circumstance contemplated and with the taking of appropriate design measures as they may appear necessary or at least desirable, operation of the compressor within the accumulator chamber will cause no significant changes in temperature in the adjacent structure and surrounding atmosphere. Particularly it will not cause significant flows of heat to or from the bed of adsorbent material within the fractionating zone of the apparatus. For this reason, the characterization of the whole apparatus as one for the "heatless" fractionation of gaseous mixtures will still be accurate.

This apparatus embodiment of the present invention will not, of course, call for the compressor to take suction from the atmosphere within the accumulator chamber. Rather, there will be a suction conduit for the compressor as well as power leads for its motor drive means brought in through the structure of this chamber. Advantages attendant upon packaging the compressing means for the gaseous mixture to be fractionated within the accumulator chamber will be generally similar to those mentioned already of so packaging any other element of an apparatus embodiment of the present invention.

It is not to be thought that the afore-described packaging concept taken in its general sense, that is, without regard to whether the air or gas compressor is inside or outside the accumulator chamber, may be employed only with single-zone apparatus for the adsorptive fractionation of gaseous mixtures. Specifically, for example, it may also be employed with a conventional two-zone apparatus.

As noted earlier in this specification, a two-zone apparatus for adsorptive fractionation of gaseous mixtures may be used to provide an essentially steady product stream of concentrated or purified stream. It has been noted further that this steady stream results from the sequential blending of the product parts of the primary effluent streams emanating from each of the beds of adsorbent material in the two fractionating zones. There will be no inconsistency with the basic operating concept of the two-zone apparatus if this apparatus be provided with an accumulator chamber. Indeed, such a chamber may be highly desirable in most actual installations of the apparatus.

Taking the case where there is an accumulator chamber associated with a two-zone apparatus in a non-packaged embodiment, product gas conduits from each of the fractionating zones may be connected to the chamber individually to effect blending of the product streams within the chamber. On the other hand, these product gas conduits may be joined into a single conduit which extends to a connection on the accumulator chamber and delivers a substantially continuous stream of product gas into this chamber. Reflux gas flow may be taken to either fractionating zone directly from the other zone or else from the accumulator chamber. Suitable valve means should be provided, however, to prevent backflow of the entire contents of the accumulator chamber through whichever zone is on a desorption cycle when compressor operation is terminated. There will, of course, be a product gas line extending out from the accumulator chamber to whatever device or system it is which is to be supplied with dry air or other purified gas generated by the apparatus.

Although the description just foregoing has been stated to be one of a two-zone apparatus with an accumulator in a non-packaged embodiment, it will be apparent that it contains no limitations which would prevent the two fractionating zones from being installed within the accumulator chamber to at least discharge their primary effluent product parts directly into this chamber. These zones might take reflux gas streams either from the atmosphere within the accumulator chamber or from the primary effluent streams of each other, suitable gas pressure reduction being provided in either case. The chamber may, of course, also contain the high pressure gaseous mixture inlet valve and low pressure secondary effluent discharge valve means and the actuating and cycle timing devices therefor which are associated with the adsorbent beds of a two-zone apparatus.

An interesting phenomenon may be noted in connection with the two-zone apparatus which can also find application in the single-zone apparatus. It has been observed that for certain fractionations of certain gaseous mixtures, and with properly adjusted adsorption and desorption cycle periods, etc., the individual fractionating zones of a two-zone apparatus may each be operated without receiving a reflux stream from the other; that is, the adsorbent bed of each zone will act to substantially purge itself of previously adsorbed key component material upon being depressurized at the start of a desorption cycle. An example of this is an apparatus having 4 A. molecular sieves for its adsorbent material, and used to generate a nitrogen-rich product stream from a feed stream of atmospheric air. Also, in a two-zone apparatus having 5 A. molecular sieves for its adsorbent material an at least somewhat oxygen-rich product stream may be generated from a feed stream of atmospheric air without any reflux flow from one fractionating zone to another, cycle periods being adjusted as necessary to suit this condition.

As pointed out earlier in this specification, the accumulator chamber of the single-zone apparatus together with the pressure switch mounted on this chamber will act as a cycle timing device as well as simply a gas storage means. The cycle timing function as such will not be appropriate for an accumulator chamber and a pressure switch mounted thereon when these elements are used in and with a two-zone apparatus for adsorptive fractionation of gaseous mixtures. It will, however, be appropriate and may be desirable that this pressure switch be employed as a safety device to shut off and blow down the gas compressing means associated with the apparatus if an excessively high level of pressure is reached in the accumulator chamber. This might happen if product gas withdrawal from the chamber were suddenly stopped, or at least its rate considerably reduced. Thereafter the pressure switch may function additionally to restart the compressor upon pressure in the accumulator chamber being reduced to a safe level as by further product gas withdrawal from this chamber, for example.

While still other apparatus embodiments of the present invention and variations of their modes of operation may suggest themselves to those skilled in the art of the adsorptive fractionation of gaseous mixtures upon reading the foregoing description and considering the accompanying drawings, it is intended to secure protection by Letters Patent of all of these other embodiments and variations within the broadest interpretation of the following claims that the relevant prior art allows.

I claim as my invention:

1. In an apparatus for the fractionation of a gaseous mixture which apparatus comprises (1) at least one closed container vessel having upper and lower ends with conduit means at both said ends, (2) a bed of adsorbent material within said container vessel, said material being preferentially adsorptive of at least one component of said mixture and so constructed and arranged as to be supplied through said vessel with an intermittent feed stream of said gaseous mixture and to discharge at different times through said vessel a primary effluent stream of gaseous material having a relatively low concentration of said one component and a secondary effluent stream of gaseous material having a relatively high concentration of said one component compared with the concentration of said one component in said mixture, (3) valve means so constructed and arranged whereby flow of said feed stream to said contained vessel may be permitted and prohibited, said valve means being further constructed and arranged whereby flow of said secondary effluent stream from said container vessel may be permitted and prohibited, (4) an accumulator chamber so constructed and arranged whereinto said primary effluent stream is discharged, and (5) at least one actuating means connected to both said valve means, the improvement which comprises said actuating means said valve means and said closed vessel with its bed of adsorbent material being located within said accumulator chamber wherein conduit means at said upper end of said vessel terminates within said accumulator and wherein said conduit means at said lower end terminates without said accumulator.

2. The apparatus according to claim 1, said actuating means being pressure-sensitive and operatively exposed to the interior region of said accumulator chamber, and said actuating means so constructed and arranged as to actuate said valve means at a predetermined lower pressure in said accumulator chamber to permit flow of said feed stream to said container vessel and prohibit flow of said secondary effluent stream from said container vessel and further constructed and arranged to actuate said valve means at a predetermined upper pressure in said accumulator chamber to prohibit flow of said feed stream to said container vessel and permit flow of said secondary effluent stream from said container vessel.

3. The apparatus according to claim 1, said actuating means including timing means so constructed and arranged whereby the frequencies of actuation of said valve means to permit and prohibit flows of said feed and secondary effluent streams may be regulated independently of the pressure in said accumulator chamber.

4. An apparatus which requires no external heat for the continuous fractionation of a gaseous mixture, which apparatus comprises: (1) at least one closed continuous container vessel having upper and lower ends, said vessel having inlet and outlet means at said upper and lower ends of smaller diameter than said vessel; (2) said vessel being so constructed and arranged to hold a bed of adsorbent material within said container vessel, said material being preferentially adsorptive of at least one component of said mixture; (3) valve means so constructed and arranged to supply said vessel alternate streams of said geseous mixture; (4) valve means so constructed and arranged to discharge at different times from said vessel an effluent stream of gaseous material having a relatively low concentration of said one component and a secondary effluent stream of gaseous material having a relatively high concentration of said one component compared with the concentration of said one component in said gaseous mixture; (5) an accumulator chamber, said container vessel and said valve means being located completely within the said accumulator chamber wherein said inlet and outlet means at said upper end of said vessel terminates within said accumulator and wherein said inlet and outlet means at said lower end of said vessel terminates without said accumulator.

References Cited by the Examiner

UNITED STATES PATENTS

| | | | |
|---|---|---|---|
| 2,316,251 | 4/43 | Kahle | 55—62 X |
| 2,596,797 | 5/52 | Case | 55—208 |
| 2,823,758 | 2/58 | Asker | 55—179 X |
| 2,944,627 | 7/60 | Skarstrom | 55—33 |
| 2,955,673 | 10/60 | Kennedy et al. | 55—62 X |

HARRY B. THORNTON, *Primary Examiner.*

HERBERT L. MARTIN, WESLEY S. COLE,
*Examiners.*